United States Patent
Wegener et al.

(10) Patent No.: US 11,447,595 B2
(45) Date of Patent: Sep. 20, 2022

(54) PULTRUDATE, PRODUCTION AND USE THEREOF

(71) Applicant: COVESTRO INTELLECTUAL PROPERTY GMBH & CO. KG, Leverkusen (DE)

(72) Inventors: Dirk Wegener, Monheim (DE); Harald Rasselnberg, Dormagen (DE); Andreas Hoffmann, Pulheim (DE); Heike Schmidt, Leverkusen (DE); Renate Dellhofen, Leverkusen (DE)

(73) Assignee: COVESTRO INTELLECTUAL PROPERTY GMBH & CO. KG, Leverkusen (DE)

( * ) Notice: Subject to any disclaimer, the term of this patent is extended or adjusted under 35 U.S.C. 154(b) by 439 days.

(21) Appl. No.: 16/495,686

(22) PCT Filed: Apr. 17, 2018

(86) PCT No.: PCT/EP2018/059790
§ 371 (c)(1),
(2) Date: Sep. 19, 2019

(87) PCT Pub. No.: WO2018/192927
PCT Pub. Date: Oct. 25, 2018

(65) Prior Publication Data
US 2020/0062887 A1    Feb. 27, 2020

(30) Foreign Application Priority Data
Apr. 18, 2017  (EP) .................................. 17166812

(51) Int. Cl.
*C08G 18/48*    (2006.01)
*B29C 70/52*    (2006.01)
*C08G 18/24*    (2006.01)
*C08G 18/76*    (2006.01)
*C08J 5/04*    (2006.01)
*B29K 75/00*    (2006.01)
*B29K 307/04*    (2006.01)

(52) U.S. Cl.
CPC ........ *C08G 18/4804* (2013.01); *B29C 70/521* (2013.01); *C08G 18/246* (2013.01); *C08G 18/7664* (2013.01); *C08J 5/042* (2013.01); *B29K 2075/00* (2013.01); *B29K 2307/04* (2013.01)

(58) Field of Classification Search
CPC .. C08G 18/48; C08G 18/246; C08G 18/7664; C08G 18/4829; C08G 18/4825; C08G 18/4837; B29C 70/521; B29C 70/52; B29K 2075/00; B29K 2307/04
USPC .......................................................... 524/495
See application file for complete search history.

(56) References Cited

U.S. PATENT DOCUMENTS 8,663,414 B2 * 3/2014 Nienkemper ........... B29C 70/52
525/440.11
10,829,582 B2 * 11/2020 Ferencz ............. C08G 18/7671

FOREIGN PATENT DOCUMENTS

WO    2011067246 A1    6/2011

OTHER PUBLICATIONS

International Search Report for International Patent Application No. PCT/EP2018/059790, dated Jul. 6, 2018. (English translation attached.).
Written Opinion for International Patent Application No. PCT/EP2018/059790, dated Jul. 6, 2018.

* cited by examiner

*Primary Examiner* — Hannah J Pak
(74) *Attorney, Agent, or Firm* — K&L Gates LLP

(57) ABSTRACT

Pultrudate based on polyurethane and carbon fibers and the production and use thereof.

6 Claims, No Drawings

PULTRUDATE, PRODUCTION AND USE THEREOF

CROSS-REFERENCE TO RELATED APPLICATIONS

This application is a U.S. national stage application, filed under 35 U.S.C. § 371, of International Application No. PCT/EP2018/059790, which was filed on Apr. 17, 2018, and which claims priority to European Patent Application No. 17166812.2, which was filed on Apr. 18, 2017. The contents of each are incorporated by reference into this specification.

FIELD

The present invention relates to pultrudates based on polyurethane and carbon fibers and to the production and use thereof.

BACKGROUND

Pultrusion is a continuous process for producing fiber-reinforced profiles of constant cross section. A pultrusion plant typically consists of an impregnation unit and a heated mold as well as a takeoff plant which keeps the process moving. Impregnation of the fibers is carried out in an open bath or in a closed injection box. For thermosetting reactive resins, for example polyurethanes, closed injection boxes are preferred. The injection boxes may be attached upstream of the actual mold as a separate unit or else may be integrated into the mold ("direct injection").

Molding and curing of the composite are then carried out in the heated mold. The finished profile is pulled from the mold by means of a takeoff plant and finally cut to the desired lengths. To make the pultrusion process as efficient as possible high process speeds coupled with very good mechanical properties of the pultrudate and a high surface quality are sought.

An essential step of the process is the impregnation of the reinforcing material, for example the fiber rovings, the fiber mats, the non-crimp fiber fabrics and the woven fiber fabrics, with the resin. To this end the individual filaments of the reinforcing fibers must be impregnated with the resin as effectively as possible. Very good impregnation is a prerequisite for the effective binding of the fibers to the matrix which ultimately ensures the functionality of the composite.

The impregnability demands on the resin naturally increase with process speed. At high takeoff speeds the impregnation of the fibers must take place in a shorter time than at a lower takeoff speed. Likewise different fiber materials place different demands on the impregnability of the resin. For example, reinforcing materials made of glass fibers are substantially easier to impregnate than corresponding reinforcing materials made of carbon fibers on account of the increased filament diameter alone.

For effective production of carbon fiber composites in the pultrusion process the impregnation resin should have the lowest possible viscosity during the impregnation phase immediately after the mixing of the components and subsequently undergo rapid curing in the heated pultrusion mold.

Polyurethane pultrudates have been described numerous times.

Thus WO 2011/067246 A1 describes a pultrusion resin system containing (a) di- or polyisocyanates, (b) compounds comprising at least two isocyanate-reactive groups, (c) catalyst, (d) polyfunctional acid having a functionality of not less than 2 and optionally (e) further assistant and additive substances. The polyfunctional acid has a boiling point of at least 200° C. at atmospheric pressure and is soluble in the compound having at least two isocyanate-reactive groups. Also described is a process for producing a pultrudate and the corresponding pultrudate (page 1, lines 5-13). Particularly preferably employed as fiber materials are carbon fibers and glass fibers (page 10, line 18). The inventive examples employ exclusively glass fibers and with the described resin achieve pultrusion speeds up to 2.5 m/min. No specific property of the pultrusion resin system making it suitable for pultrusion with carbon fibers is mentioned. Other than stating that the pultrusion resin system has a viscosity of less than 1500 mPas at 25° C. (claim 9) immediately after the mixing of the components (a) to (e), which applies to all recited fiber materials, the application provides no information whatsoever about the chemical composition and the suitable viscosity of the employed polyurethane resins for pultrusion with carbon fibers.

US 2008/090966 A1 describes a reaction system for producing a fiber-reinforced composite in the pultrusion process containing an endless fiber-reinforcing material and an immiscible polyurethane formulation containing a polyisocyanate component containing at least one polyisocyanate and an isocyanate-reactive component containing at least one isocyanate-reactive substance. Also described are a pultrusion process and a fiber-reinforced polyurethane composite produced with this process. Recited as suitable reinforcing fibers are all fibers suitable for pultrusion, including glass fibers and carbon fibers. No specific property of the reaction system making it suitable for pultrusion with carbon fibers, for example a suitable viscosity profile during polyurethane formation, is mentioned.

US 2008/0087373 A1 describes a polyurethane system and a pultrusion process for producing a fiber-reinforced composite. The polyurethane system consists of at least one isocyanate and an isocyanate-reactive component containing at least one polymer polyol. Fiber reinforcements recited as suitable include inter alia glass fibers and carbon fibers. Specific properties of the reaction system for processing with carbon fibers are absent from the application. On the contrary, due to their high viscosity polymer polyols would be expected to be rather disadvantageous for sufficient impregnation of carbon fibers during the impregnation phase of the pultrusion process

SUMMARY

The present invention accordingly has for its object to provide pultrudates comprising carbon fibers as the reinforcing material which exhibit a very good impregnation of the fibers with the resin while also being producible in simple and rapid fashion.

This object was surprisingly achieved by the polyurethane pultrudates according to the invention and the process according to the invention.

In the context of the present application the term "polyisocyanate" refers to an organic compound containing two or more isocyanate groups (—N═C═O).

In the context of the present application "monomeric MDI" is to be understood as meaning a polyisocyanate mixture consisting of one or more compounds selected from 4,4'-diphenylmethane diisocyanate, 2,4'-diphenylmethane diisocyanate and 2,2'-diphenylmethane diisocyanate.

In the context of the present application "oligomeric MDI" is to be understood as meaning a polyisocyanate mixture consisting of polynuclear homologs of MDI which have at least 3 aromatic nuclei and a functionality of at least 3.

In the context of the present application "polymeric MDI" is used to refer to a mixture consisting of oligomeric MDI and monomeric MDI.

The invention provides polyurethane pultrudates consisting of 40-80 vol %, preferably 50-75 vol %, of carbon fibers and polyurethane resin having a density of >1.05 g/cm³, wherein the polyurethane is obtainable from a reaction mixture consisting of
a polyisocyanate component (A),
a polyol component (B) consisting of
  b1) a mixture of at least two polyols,
  b2) 0-20% by weight based on the total weight of (B) of one or more further isocyanate-reactive compounds distinct from b1),
  in the presence of
  b3) 0-5% by weight based on the total weight of B) of one or more catalysts,
  b4) 0-20% by weight based on the total weight of (B) of further assistant and/or additive substances, and
0.1-8% by weight based on the total weight of (B) of at least one internal release agent (C),
characterized in that
the polyisocyanate component (A) contains
  1) >55% by weight based on the total weight of (A) of monomeric diphenylmethane diisocyanate (MDI), wherein
  2) the sum of 2,2'-MDI and 2,4'-MDI based on the total weight of (A) is <40% by weight, and
  3) contains no prepolymer,
the polyol component (B) contains no polymer polyol,
the number-average hydroxyl number of the sum of the components in (B) is ≥400 mg KOH/g and ≤2000 mg KOH/g,
the sum of the nominal OH functionalities in (B) has a number-average value between 2.5 and 3.5, and
the ratio of the number of NCO groups in (A) to the sum of the number of OH groups in (B) and (C) multiplied by 100 (the so-called index) has a value of 90-120.

Particular preference is given to polyurethane pultrudates consisting of 50-75 vol % of carbon fibers and polyurethane resin having a density of >1.05 g/cm³, wherein the polyurethane is obtainable from a reaction mixture consisting of
a polyisocyanate component (A),
a polyol component (B) consisting of
  b1) a mixture of at least two polyether polyols,
  b2) 0-15% by weight based on the total weight of (B) of aliphatic alcohols,
  in the presence of
  b3) 0-5% by weight, particularly preferably 0.1-2% by weight, very particularly preferably 0.5-2% by weight, based on the total weight of B) of one or more metal catalysts,
  b4) 0-20% by weight based on the total weight of (B) of further assistant and/or additive substances,
0.1-6% by weight, particularly preferably 0.1-4% by weight, based on the total weight of (B) of at least one internal release agent (C),
characterized in that
the polyisocyanate component (A) contains
  1) >65% by weight, particularly preferably >80% by weight, based on the total weight of (A) of monomeric MDI, wherein
  2) the sum of 2,2'-MDI and 2,4'-MDI based on the total weight of (A) is ≤30% by weight, and
  3) contains no prepolymer,
the polyol component (B) contains no polymer polyol,
the number-average hydroxyl number of the sum of the components in (B) is ≥420 mg KOH/g and ≤700 mg KOH/g, particularly preferably ≥450 mg KOH/g and ≤650 mg KOH/g, and
the sum of the nominal OH functionalities in (B) has a number-average value between 2.6 and 2.8, and
the ratio of the number of NCO groups in (A) to the sum of the number of OH groups in (B) and (C) multiplied by 100 has a value of 90-120.

DETAILED DESCRIPTION

The polyisocyanate component (A) by preference contains more than 55% by weight, preferably more than 65% by weight and particularly preferably more than 80% by weight based on the total weight of (A) of monomeric diphenylmethane diisocyanate (MDI).

In addition to the less than 40% by weight (preferably ≤30% by weight) of 2,4'-MDI and/or 2,2'-MDI the polyisocyanate component preferably contains 4,4'-MDI and oligomeric MDI.

The NCO content of the polyisocyanate component (A) is by preference more than 25% by weight, preferably more than 30% by weight, particularly preferably more than 31.5% by weight.

The viscosity of the polyisocyanate component (A) is by preference ≤250 mPas (at 25° C.), preferably ≤50 mPas (at 25° C.) and particularly preferably ≤35 mPas (at 25° C.) measured according to DIN 53019-1.

The functionality of the polyisocyanate component (A) is by preference 2.1 to 2.9, preferably 2.1 to 2.5, particularly preferably 2.1 to 2.3.

Additionally employable are the customary aliphatic, cycloaliphatic, araliphatic di- and/or polyisocyanates and in particular aromatic isocyanates known from polyurethane chemistry. Examples of such suitable polyisocyanates are ethylene diisocyanate, 1,4-butylene diisocyanate, 1,5-pentane diisocyanate, 1,6-hexamethylene diisocyanate (HDI), 1,12-dodecane diisocyanate, cyclobutane-1,3-diisocyanate, cyclohexane-1,3- and -1,4-diisocyanate and mixtures of these isomers, isophorone diisocyanate (IPDI), 2,4- and 2,6-hexahydrotolylene diisocyanate and mixtures of these isomers, 2,2,4- and/or 2,4,4-trimethylhexamethylene diisocyanate, bis(4,4'-, 2,4'- and 2,2'-isocyanatocyclohexyl)methane or mixtures of these isomers and aromatic isocyanates of general formula R(NCO)z, wherein R is a polyvalent organic radical comprising an aromatic and z is an integer of at least 2. Examples thereof are 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-tolylene diisocyanate, 2,6-tolylene diisocyanate, mixtures of 2,4- and 2,6-tolylene diisocyanate, 1,5-naphthalene diisocyanate, 1-methoxy-2,4-phenylene diisocyanate, 4,4'-biphenylene diisocyanate, 3,3'-dimethyl-4,4'-diphenylmethane diisocyanate, and 3,3'-dimethyldiphenylmethane-4,4'-diisocyanate; triisocyanates, such as 4,4',4"-triphenylmethane triisocyanate and 2,4,6-toluene triisocyanate, and tetraisocyanates such as 4,4'-dimethyl-2,2'-5,5'-diphenylmethane tetraisocyanate and 1,3- and/or 1,4-bis(2-isocyanatoprop-2-yl)benzene (TMXDI), 1,3-bis(isocyanatomethyl)benzene (XDI).

Also employable in addition to the abovementioned isocyanates are modified isocyanates, for example those having a uretdione, isocyanurate, carbodiimide, uretonimine, allophanate or biuret structure.

Employable according to the invention as the mixture (b1) of at least two polyols are polyether polyols, polyester polyols, polyether ester polyols and/or polycarbonate polyols. Preferably employed in the mixture (b1) are polyether polyols and/or polyester polyols, particularly preferably polyether polyols.

In addition to the OH function the polyols employed as b1) may also contain other isocyanate-reactive hydrogen atoms (=active hydrogen atoms), for example NH groups and $NH_2$ groups. To the extent that such further active hydrogen atoms are present preferably more than 90%, in particular more than 95%, particularly preferably more than 99% and very particularly preferably 100% of all isocyanate-reactive hydrogen atoms in the polyol formulation originate from OH functions.

Such polyols are described for example by Ionescu in "Chemistry and Technology of Polyols for Polyurethanes", Rapra Technology Limited, Shawbury 2005, p. 31 et seq. (chapt. 3: The General Characteristics of Oligo-Polyols), p. 55 et seq. (chapt. 4: Oligo-Polyols for Elastic Polyurethanes), p. 263 et seq. (chapt. 8: Polyester Polyols for Elastic Polyurethanes) and in particular on p. 321 et seq. (chapt. 13: Polyether Polyols for Rigid Polyurethane Foams) and p. 419 et seq. (chapt. 16: Polyester Polyols for Rigid Polyurethane Foams).

Preferably employed as mixture b1) are two or more polyether polyols producible in a manner known per se by polyaddition of alkylene oxides such as propylene oxide and/or ethylene oxide onto polyfunctional starter compounds in the presence of catalysts. The polyhydroxyl polyethers are preferably produced from a starter compound having on average 2 to 8 active hydrogen atoms and one or more alkylene oxides, for example ethylene oxide, butylene oxide and/or propylene oxide. Preferred starter compounds are molecules having two to eight hydroxyl groups per molecule such as water, ethylene glycol, propylene glycol, diethylene glycol, dipropylene glycol, triethylene glycol, tripropylene glycol, 1,4-butanediol, 1,6-hexanediol, bisphenol A, glycerol, trimethylolpropane, pentaerythritol, sorbitol and sucrose and aminic starter compounds such as ethylenediamine and triethanolamine for example. These may be used alone or in admixture. Particular preference is given to 1,2- and 1,3-propylene glycol, diethylene glycol, sorbitol, glycerol, trimethylolpropane, sucrose and mixtures of the recited products. Representatives of the recited component b1) are described for example in Kunststoff-Handbuch, Vol VII "Polyurethanes", 3rd edition, Carl Hanser Verlag, Munich/Vienna, 1993, pages 57-67 and pages 88-90.

The polyester polyols are polyhydroxyl compounds comprising ester groups, for example, castor oil or polyhydroxyl polyesters, such as are obtainable by polycondensation of excess amounts of simple polyhydric alcohols of the type recited hereinabove by way of example with preferably dibasic carboxylic acids or their anhydrides, for example adipic acid, phthalic acid or phthalic anhydride.

The polyurethane system may contain 0-20% by weight, preferably 0-15% by weight, based on the total weight of (B) of further isocyanate-reactive components b2) which are distinct from the mixture b1). These are known per se as components for polyurethane. Examples include polyhydric alcohols and (oxy)alkylene diols, for example ethylene glycol and oligomers thereof, propylene glycol and oligomers thereof, 1,6-hexanediol, glycerol or trimethylolpropane and further OH-functional compounds such as for example sorbitol or bis(2-hydroxyethyleneoxy)benzene.

Employable as catalyst component (b3) are for example the known polyurethane catalysts, for example organic metal compounds, such as potassium or sodium salts of organic carboxylic acids, for example, potassium acetate; likewise tin(II) salts of organic carboxylic acids, for example tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dimethyltin dilaurate, dibutyltin maleate and dioctyltin diacetate, and also, for example, diisooctyl-2,2'-[(dioctylstannylene)bis(thio)] diacetate, di-n-butyl-bis(dodecylthio)tin, 2-ethylhexyl-4,4'-dibutyl-10-ethyl-7-oxo-8-oxa-3,5-dithia-4-stanna tetradecanoate, dimethyltin dithioglycolate and/or strongly basic amines such as 2,2,2-diazabicyclooctane, N,N-dimethylaminopropylamine, N,N-bis(3-dimethylaminopropyl)-N-isopropanolamine, triethylamine, triethylenediamine, tetramethylhexamethylenediamine, pentamethyldiethylenetriamine, N,N-dimethylcyclohexylamine or bis(N,N-dimethylaminoethyl)ether, N,N-dimethylbenzylamine, N,N-methyldibenzylamine and N-methylimidazole and latent catalysts. Latent catalysts and their mechanism of action are described for example in EP 2531538 A1, pages 1-4 and page 9, line 26 to page 10, line 2. Typical latent catalysts are blocked amine and amidine catalysts, for example catalysts from Air Products (for example Polycat® SA-⅒, Dabco KTM 60) and Tosoh Corporation (such as for instance Toyocat® DB 2, DB 30, DB 31, DB 40, DB 41, DB 42, DB 60, DB 70). Further representatives of catalysts and details concerning the mode of action of the catalysts are described in the Kunststoff-Handbuch, volume VII "Polyurethane", 3rd edition, Carl Hanser Verlag, Munich/Vienna, 1993 on pages 104-110.

Suitable assistant and additive substances b4) include all assistant and additive substances known for the production of polyurethanes. Such substances are known and described for example in "Kunststoffhandbuch, volume 7, Polyurethane", Carl Hanser Verlag, 3rd edition 1993, Chapter 3.4.4 and 3.4.6 to 3.4.11. Examples include for example surface-active substances, defoamers, emulsifiers, viscosity reducers, dyes, pigments, flame retardants, water binders, for example tris(chlorethyl) orthoformate, alkaline earth metal oxides, zeolites, aluminum oxides and silicates and adhesion promoters and fillers, such as calcium carbonate, barium sulfate, titanium dioxide, short fibers, for example made of glass or carbon or natural minerals, for example talc, wollastonite or muscovite.

Employable internal release agents (C) include all release agents customary in the production of polyurethanes, for example long-chain monocarboxylic acids, in particular fatty acids such as stearic acid, amines of long-chain carboxylic acids such as stearamide, fatty acid esters, metal salts of long-chain fatty acids such as zinc stearate or silicones. Particularly suitable are the internal release agents obtainable specifically for pultrusion, for example MOLD WIZ INT-1948 MCH, MOLD WIZ INT-1947 MCH, MOLD WIZ INT-1960 MCH obtainable from Axel Plastics or Luvotrent TL HB 550-D, Luvotrent TL HB 550, obtainable from Lehmann&Voss. The internal release agents are employed in amounts of 0.1-8% by weight, preferably 0.1-6% by weight and particularly preferably 0.1-4% by weight based on the total weight of (B).

The invention further provides a process for producing the polyurethane pultrudates according to the invention comprising the steps of:

i) mixing the components (A), (B) and (C) to obtain a polyurethane reactive mixture
ii) conveying the polyurethane reactive mixture into an injection box
iii) simultaneously with process step ii) introducing carbon fibers through the injection box to impregnate the carbon fibers with the polyurethane reactive mixture
iv) introducing the carbon fibers impregnated with the polyurethane reactive mixture into a heated curing mold
v) curing the carbon fibers impregnated with the polyurethane reactive mixture in the curing mold to form a polyurethane pultrudate
vi) pulling the cured polyurethane pultrudate from the curing mold by means of pulling mechanisms
vii) cutting the cured polyurethane pultrudate to the desired length.

The mixing of the components (A), (B) and (C) may be effected in a manner customary for the production of polyurethane reactive mixtures, for example in a high pressure or low pressure process. It is preferable when the components (B) and (C) are premixed and the resulting mixture is mixed with the component (A).

The temperature during impregnation of the carbon fibers in the process step iii) is preferably 0-75° C., particularly preferably 10-50° C. and very particularly preferably 15-35° C. The curing step v) is preferably carried out at a temperature of the mold of 140-220° C., wherein the mold preferably comprises a plurality, for example 3 or 4, of zones of different temperatures.

The carbon fibers are in the form of endless fibers. The term endless fiber is to be understood as meaning a fiber material having a length of at least several meters. These are unwound from rolls or spools for example. Employable fiber materials are individual fibers, so-called fiber rovings, braided fibers, fiber mats, non-crimp fiber fabrics and woven fiber fabrics. Particularly in the case of fiber assemblies such as braided fibers, twisted fibers or woven fiber fabrics the individual fibers in these fiber assemblies may also contain shorter individual fibers. The fiber assembly itself must be in the form of an endless material.

In a preferred embodiment of the invention the carbon fibers are employed in the form of fiber rovings.

In a further embodiment a proportion of the carbon fibers, preferably in the edge regions of the polyurethane pultrudate may be replaced by glass fibers.

In a further preferred embodiment of the invention process step iii) comprises passing not only the carbon fibers but also so-called peel plies through the injection box such that these preferably form at least two exterior sides of the finished polyurethane pultrudate. In further processing of the polyurethane pultrudates according to the invention this peel ply can be removed from the exterior sides to form at least two rough surfaces, thus for example facilitating adhesive bonding of the polyurethane pultrudates.

The polyurethane pultrudates according to the invention may be employed for example as lightweight reinforcing profiles and structural elements in vehicle and aircraft construction and in wind power plants. Such lightweight reinforcing profiles may be used for example for producing so-called "spar caps" in rotor blades of wind power plants.

The invention shall be more particularly elucidated in the examples which follow.

EXAMPLES

The viscosity profile of inventive polyurethane reactive mixtures was determined using a rheometer after mixing the components (A), (B) and (C) and compared with noninventive polyurethane reactive mixtures.

Rheometer: MCR 502 from Anton Paar

Viscosity measurement according to DIN 53019-1:2008-09 (H<<R), (d/dt=100 1/s): d/dt=shear rate, plate—plate measuring system PP 25, measurement in rotation.

To record the viscosity profile the polyol mixtures reported in table 1 were in each case admixed with the recited amount of internal release agent, subjected to intensive stirring and temperature-controlled to 23° C. Subsequently, an amount of isocyanate corresponding to the index reported in table 1 and temperature-controlled to 23° C. was added and the mixture stirred for 20 s. 300 µl of the mixture were then immediately placed on the lower plate of the rheometer and measurement commenced. The plates of the rheometer had been temperature-controlled to 23° C. prior to commencement of measurement. At commencement of measurement the plate temperature was heated at a rate of 33 K/min to 139° C. and the viscosity after different time intervals and the viscosity minimum were determined. The first data point was recorded 15 seconds after completion of the mixing of the polyol/release agent mixture with the isocyanate.

Fiber impregnation and curing of the polyurethane reactive mixtures were further evaluated during production of the polyurethane pultrudates.

A pultrusion plant having a heatable mold with internal dimensions of 60×5 mm and an injection box connected upstream of the mold was employed. Accordingly, right-angle profiles having a width of 60 mm and a wall thickness of 5 mm were produced. Carbon fiber rovings (Pyrofil® TRW 40 50 L KNA from Mitsubishi Rayon Co. Ltd.) were used as the reinforcing material and pulled through the injection box and the mold. The concentration of carbon fibers in the finished profile was about 65 vol %. The polyol mixtures reported in table 1 were in each case admixed with the specified amount of internal release agent and subjected to intensive stirring. These mixtures were in each case mixed at 23° C. with sufficient isocyanate to achieve the respective NCO index reported in table 1 using a low-pressure mixing machine with a static mixer and the resulting polyurethane reactive mixture was continuously injected into the injection box. By means of the takeoff mechanism of the pultrusion plant the wetted carbon fibers were continuously pulled through the heated mold and cured at a speed of 1.50 m/min. The temperature control of the mold was divided into 3 zones with temperatures of 170° C. in zone 1 (mold inlet in takeoff direction), 190° C. in zone 2 (mold center) and 200° C. in zone 3 (mold outlet). The finished profiles were then continuously cut to the desired length.

The following starting materials were employed:

Polyol 1: Glycerol-started triol, propoxylated, OHN=235 mg KOH/g

Polyol 2: Glycerol-started triol, propoxylated, OHN=1050 mg KOH/g

Polyol 3: Glycerol-started triol, propoxylated, OHN=400 mg KOH/g

Polyol 4: Propylene glycol-started diol, propoxylated, OHN=28 mg KOH/g

Polyol 5: Propylene glycol-started diol, propoxylated, OHN=515 mg KOH/g

Polyol 6: Propylene glycol-started diol, propoxylated and ethoxylated, OHN=57 mg KOH/g Polyol 7: Glycerol-started triol, propoxylated, OHN=800 mg KOH/g
Glycerol
Catalyst 1: Diisooctyl 2,2'-[(dioctylstannylene)bis(thio)]diacetate
Catalyst 2: TOYOCAT-DB30 from Tosoh Corporation
Water binder 1: MOLSIV® L—powder from UOP
Water binder 2: MOLSIV® L—paste (50% dispersion of MOLSIV® L powder in castor oil) from UOP
Polyfunctional acid: Acid based on phthalic esters with diethylene glycol, acid number=127 mg KOH/g
Internal release agent 1: Luvotrent® TL HB 550 from Lehmann&Voss for pultrusion
Internal release agent 2: MOLD WIZ INT-1947 MCH
MDI 1: Polymeric MDI having an NCO content of 32.0% by weight, a content of monomeric MDI of 69% by weight; the content of 2,4'-MDI and 2,2'-MDI sums to 8% by weight
MDI 2: Polymeric MDI having an NCO content of 31.5% by weight, a content of monomeric MDI of 47.5% by weight; the content of 2,4'-MDI and 2,2'-MDI sums to 5.4% by weight
MDI 3: Monomeric MDI having an NCO content of 33.6% by weight; the content of 2,4'-MDI and 2,2'-MDI sums to 55.1% by weight
MDI 4: Mixture of 80 pbw of polymeric MDI having a viscosity of 200 mPas at 25° C. and a content of monomeric MDI of 39% by weight and 20 pbw of monomeric MDI based on 2,4'-MDI and 4,4'-MDI. The content of the mixture of monomeric MDI is 51.2% by weight.

The polyurethane reactive mixtures used in the examples which result in polyurethanes having a density of >1.05 g/cm$^3$ are shown in table 1 (amounts in parts by weight) and the corresponding results are summarized in table 2.

TABLE 1

|  | Example 1 | Example 2 | Example 3 (comparison) | Example 4 (comparison) | Example 5 (comparison) | Example 6 | Example 7 (comparison) |
| --- | --- | --- | --- | --- | --- | --- | --- |
| Polyol 1 | 28.47 | — | 28.47 | 28.47 | 28.33 | — | — |
| Polyol 2 | 26.00 | — | 26.00 | 26.00 | 20.00 | — | — |
| Glycerol | — | 11.00 | — | — | — | — | — |
| Polyol 3 | 23.81 | 62.20 | 23.81 | 23.81 | — | 50.00 | 50.00 |
| Polyol 4 | 9.79 | — | 9.79 | 9.79 | 10.00 | — | — |
| Polyol 5 | 9.26 | 10.00 | 9.26 | 9.26 | 39.00 | — | — |
| Polyol 6 | — | 12.00 | — | — | — | — | — |
| Polyol 7 | — | — | — | — | — | 45.00 | 45.00 |
| Catalyst 1 | 0.67 | 0.80 | 0.67 | 0.67 | 0.67 | — | — |
| Catalyst 2 | — | — | — | — | — | 1.25 | 1.25 |
| Water binder 1 | 2.00 | — | 2.00 | 2.00 | 2.00 | — | — |
| Water binder 2 | — | 4.00 | — | — | — | — | — |
| Polyfunctional acid | — | — | — | — | — | 2.00 | 2.00 |
| Average OH number of B | 486 | 512 | 486 | 486 | 480 | 570 | 570 |
| Nominal functionality of B | 2.73 | 2.64 | 2.73 | 2.73 | 2.43 | 2.9 | 2.9 |
| IMR 1 | 4.00 | 4.00 | 4.00 | 4.00 | 4.00 | — | — |
| IMR 2 | — | — | — | — | — | 5.00 | 5.00 |
| Isocyanate | MDI 1 | MDI 1 | MDI 2 | MDI 3 | MDI 1 | MDI 1 | MDI 4 |
| Sum of monomeric MDI | 69 | 69 | 47.5 | 100 | 69 | 69 | 51.2 |
| Sum of 2,2'-MDI and 2,4'-MDI | 8 | 8 | 5.4 | 55.1 | 8 | 8 | 14.4 |

TABLE 2

|  | Example 1 | Example 2 | Example 3 (comparison) | Example 4 (comparison) | Example 5 (comparison) | Example 6 | Example 7 (comparison) |
| --- | --- | --- | --- | --- | --- | --- | --- |
| Viscosity [mPas] at t = 15 s (temp. = 23° C.) | 272 | 246 | 571 | 88 | 191 | 285 | 637 |
| Viscosity [mPas] at t = 59 s (T = 51° C.) | 122 | 99 | 196 | 36 | 75 | 215 | 218 |
| Viscosity [mPas] at t = 91 s (T = 69° C.) | 44 | 43 | 91 | 19 | 35 | 40 | 76 |
| Viscosity minimum [mPas] | 29 | 31 | 45 | 13 | 24 | 30 | 39 |
| Viscosity [mPas] at t = 209 s (T = 131° C.) | 1285 | 1461 | 1147 | 69 | 400 | 551 | 513 |
| Viscosity [mPas] at t = 227 s (T = 139° C.) | 9336 | 9588 | 8966 | 140 | 1602 | 3956 | 3631 |

TABLE 2-continued

|  | Example 1 | Example 2 | Example 3 (comparison) | Example 4 (comparison) | Example 5 (comparison) | Example 6 | Example 7 (comparison) |
|---|---|---|---|---|---|---|---|
| Fiber impregnation | good | good | poor; many unwetted fibers | good | good | good | poor; many unwetted fibers |
| Curing | good | good | good | poor; tacky surface of profiles with a lot of abrasion; not dimensionally stable | poor; profiles very soft | good | good |

Examples 1 and 2 showed a low viscosity at the beginning of the reaction which resulted in good impregnation of the carbon fibers. The high viscosity after 227 seconds reflects the good curing observed in the pultrusion experiment. In example 3 the initial viscosity was markedly higher with corresponding poor impregnation of the carbon fibers. The mixture used in example 4 did result in good fiber impregnation but curing was wholly insufficient at the pulling speed employed. In example 5 the poor functionality of component B resulted in poor curing behavior; at the specified speed the polyurethane pultrudates were too soft at the mold end. Examples 6 and 7 show that when using a polyol system with a polyfunctional acid only an isocyanate according to the invention affords the desired combination of good fiber impregnation and good curing in pultrusion with carbon fibers.

What is claimed is:

1. A polyurethane pultrudate consisting of 40-80 vol % of carbon fibers and a polyurethane resin having a density of >1.05 g/cm$^3$, wherein the polyurethane resin is obtained from a reaction mixture consisting of:
   (A) a polyisocyanate component,
   (B) a polyol component consisting of:
      b1) a mixture of at least two polyols,
      b2) 0-20% by weight based on the total weight of (B) of one or more further isocyanate-reactive compounds distinct from b1),
      in the presence of
      b3) 0-5% by weight on the total weight of (B) of one or more catalysts,
      b4) 0-20% by weight based on the total weight of (B) of further assistant and/or additive substances,
   (C) 0.1-8% by weight based on the total weight of (B) of at least one internal release agent,
   wherein the polyisocyanate component (A) comprises:
      1) >55% by weight based on the total weight of (A) of monomeric diphenylmethane diisocyanate (MDI), wherein
      2) a sum of 2,2'-MDI and 2,4'-MDI based on the total weight of (A) is <40% by weight, and
      3) no prepolymer,
   wherein the polyol component (B) is free of any polymer polyol,
   a number-average hydroxyl number of a sum of the components in (B) is ≥400 mg KOH/g and ≤2,000 mg KOH/g,
   a sum of the nominal OH functionalities in (B) has a number-average value between 2.5 and 3.5, and a ratio of the number of NCO groups in (A) to a sum of the number of OH groups in (B) and (C) multiplied by 100 has a value of 90-120.

2. A polyurethane pultrudate consisting of 50-75 vol % of carbon fibers and a polyurethane resin having a density of >1.05 g/cm$^3$, wherein the polyurethane resin is obtained from a reaction mixture consisting of:
   (A) a polyisocyanate component,
   (B) a polyol component consisting of:
      b1) a mixture of at least two polyether polyols,
      b2) 0-15% by weight based on the total weight of (B) of aliphatic alcohols,
      in the presence of
      b3) 0-5% by weight on the total weight of (B) of one or more metal catalysts,
      b4) 0-20% by weight based on the total weight of (B) of further assistant and/or additive substances,
   (C) 0.1-6% by weight based on the total weight of (B) of at least one internal release agent, wherein the polyisocyanate component (A) comprises:
      1) >65% by weight based on the total weight of (A) of monomeric MDI, wherein
      2) a sum of 2,2'-MDI and 2,4'-MDI based on the total weight of (A) is ≤30% by weight, and
      3) no prepolymer,
   wherein the polyol component (B) is free of any polymer polyol,
   a number-average hydroxyl number of a sum of the components in (B) is ≥420 mg KOH/g and ≤700 mg KOH/g,
   a sum of the nominal OH functionalities in (B) has a number-average value between 2.6 and 2.8, and a ratio of the number of NCO groups in (A) to a sum of the number of OH groups in (B) and (C) multiplied by 100 has a value of 90-120.

3. A process for producing the polyurethane pultrudate as claimed in claim 1 comprising:
   i) mixing the components (A), (B) and (C) to obtain a polyurethane reactive mixture,
   ii) conveying the polyurethane reactive mixture into an injection box,
   iii) simultaneously with process step ii) introducing carbon fibers through the injection box to impregnate the carbon fibers with the polyurethane reactive mixture,
   iv) introducing the carbon fibers impregnated with the polyurethane reactive mixture into a heated curing mold, and
   v) curing the carbon fibers impregnated with the polyurethane reactive mixture in the curing mold to form a polyurethane pultrudate.

4. A lightweight reinforcing profile or structural element in vehicle or aircraft construction or in a wind power plant, wherein the profile or element comprises the polyurethane pultrudate as claimed in claim 1.

5. A process for producing the polyurethane pultrudate as claimed in claim 2 comprising:
   i) mixing the components (A), (B) and (C) to obtain a polyurethane reactive mixture, ii) conveying the polyurethane reactive mixture into an injection box, iii) simultaneously with process step ii) introducing carbon fibers through the injection box to impregnate the carbon fibers with the polyurethane reactive mixture, iv) introducing the carbon fibers impregnated with the polyurethane reactive mixture into a heated curing mold, and v) curing the carbon fibers impregnated with the polyurethane reactive mixture in the curing mold to form a polyurethane pultrudate.

6. A lightweight reinforcing profile or structural element in vehicle or aircraft construction or in a wind power plant, wherein the profile or element comprises the polyurethane pultrudate as claimed in claim 2.

* * * * *